Figure 5:
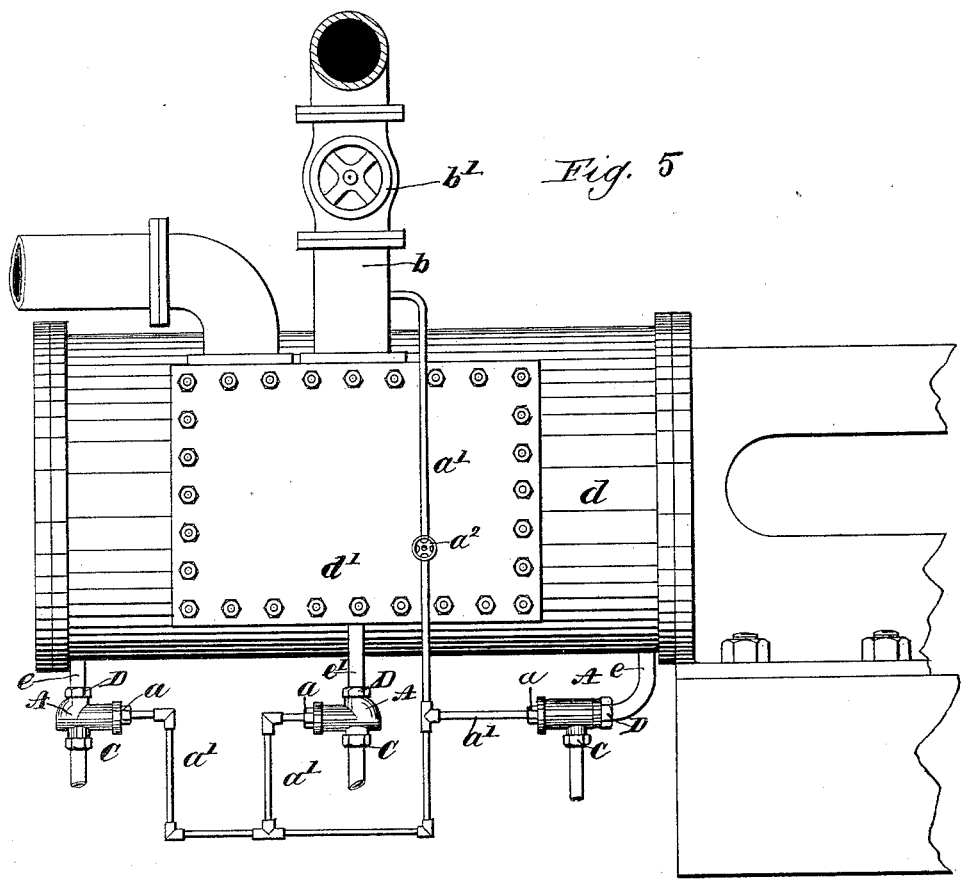

(No Model.)
J. PHILLIPSON.
DRAIN VALVE.
No. 462,823. Patented Nov. 10, 1891.
2 Sheets—Sheet 1.
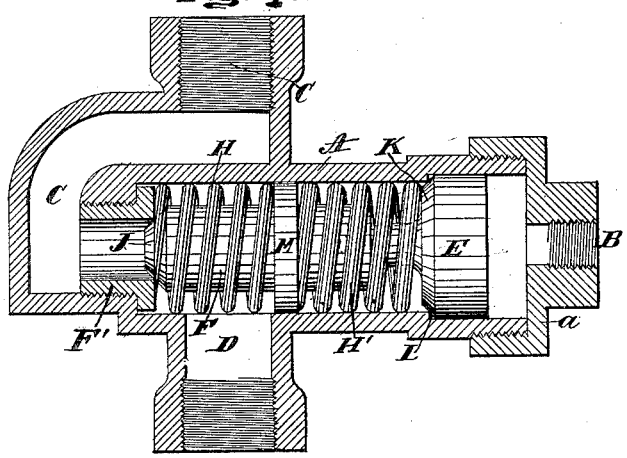
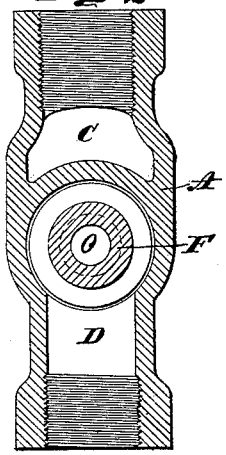
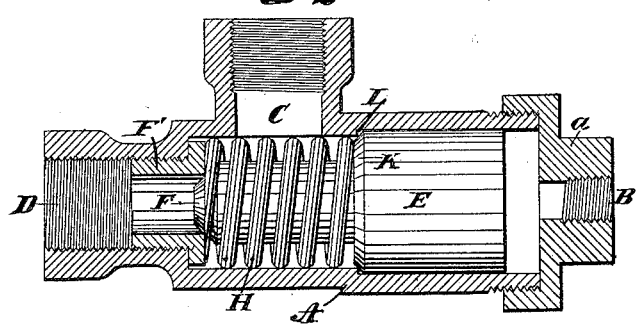
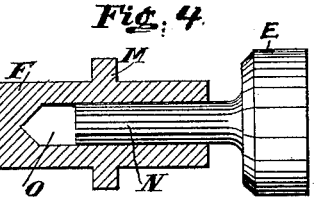
Witnesses:
H. B. Kingsbery
C. G. Northup
Inventor:
John Phillipson
by William E. Poulter
atty.

(No Model.)

2 Sheets—Sheet 2.

J. PHILLIPSON.
DRAIN VALVE.

No. 462,823. Patented Nov. 10, 1891.

UNITED STATES PATENT OFFICE.

JOHN PHILLIPSON, OF BRADFORD, ENGLAND, ASSIGNOR OF ONE-HALF TO JONATHAN RUSHFORTH, OF SAME PLACE.

DRAIN-VALVE.

SPECIFICATION forming part of Letters Patent No. 462,823, dated November 10, 1891.

Application filed May 7, 1890. Serial No. 350,921. (No model.)

*To all whom it may concern:*

Be it known that I, JOHN PHILLIPSON, a subject of the Queen of England, residing at Bradford, in England, have invented certain new and useful Improvements in Drain Valves or Cocks for the Cylinders and Steam-Pipes of Steam-Engines, of which the following is a full, clear, and exact description.

The object of this invention is to provide an automatic drain cock or valve for the cylinders and steam-pipes of steam-engines, applicable also to be used as a relief-valve.

The said improvements consist in the arrangements hereinafter described, in which the pressure of the steam is employed to close the valve when the engine is put into operation, and a spring is employed to open the valve as soon as the engine is stopped and the pressure of the steam reduced.

Figure 1 is a longitudinal section of the improved valve. Fig. 2 is a cross-section of the same. Fig. 3 is a similar view of a modification. Fig. 4 is a sectional view of a detail hereinafter referred to. Fig. 5 is an elevation of a cylinder and steam-chest, showing my improvements applied thereto.

The end of the valve-casing A is connected, preferably, by a short length of pipe $a'$ from the opening B in the cap $a$ to the steam-supply pipe $b$ at any convenient point between the stop-valve $b'$ and the cylinder $d$, and either of the passages C or D is connected to the cylinder in a similar manner to an ordinary drain-valve; but to simplify the following description the passage D is assumed to be the one thus connected by means of pipe $e'$. A piston E is fitted in said casing and carries a projecting valve F, adapted to close the passage D, and a spring H is provided, located between the plug $F'$ and a collar M, formed on the body of the valve, forming a bearing for the spring and also acting as a guide for the valve. The spring H tends to press the valve F to the right, and thus open said valve.

In Figs. 1 and 4 the valve F and piston E are capable of slight independent motion, and a second spring $H'$, stronger than that of H, is introduced between them bearing upon collar M and the piston. This spring $H'$ is sufficiently strong not to be substantially affected by the pressure of the steam from the cylinder on the face J of the valve, but is capable of being compressed by the pressure of the steam upon the larger area of the face of the piston E, which allows said piston to be pressed inward by such pressure until the valve-shaped face K at the rear of such piston meets the valve-seat L, formed in the casing A, and completely closes the passage, assuming there should be any leakage due to the piston fitting the case imperfectly.

As shown in Fig. 3, when the steam is turned on to start the engine it is simultaneously admitted to the face of the piston E through the opening B and permanently acts upon said piston while the engine is in operation and overcomes the intermittent pressure of the steam upon the other side of the piston admitted through the passage C from the cylinder, and compressing the spring H closes the valve. At the same time that the valve reaches its seat a valve-shaped face K on piston E meets the valve-seat L formed in the casing, and thus prevents steam leaking past the piston.

It is found in practice that when a spring of suitable strength is employed and the opening B is not too large the valve does not close at once when the steam is turned on, but remains open a sufficient time for any water accumulated in the cylinder to be driven past such valve and through the passage C into the waste-pipe before it closes.

In Fig. 5 I have shown one of my improved valves applied to each end of the cylinder, and also a valve applied to the steam-chest intermediate the ends of the cylinder, all of said valves being adapted to serve as small relief-valves. In this arrangement the pipe $a'$ has branches which connect the valves with each other by means of their caps $a$.

The intermediate valve is connected with the steam-chest by means of the pipe $e'$. The valves at each end of the cylinder are connected therewith similarly by means of the pipes $e$.

$a^2$ is a cut-off valve located in the pipe $a'$ intermediate the main steam-pipe and the drain-valves.

The arrangement shown in Fig. 1 acts well also as a relief-valve, as undue pressure in the cylinder occasioned by the presence of water opens the valve F by compressing the spring H without moving the piston E. The piston is provided with a shank N at the back, which fits into a socket O in the valve and tends to keep the valve and piston concentric.

I claim—

The combination, with the valve-casing provided with the passages B C D, the valve-seat L, and an abutment upon its interior, forming a second valve-seat, of the valve F, provided with a conical face adapted to seat against the latter valve-seat of the casing and with a socket in its body, the piston E, provided with the conical face adapted to seat against the valve-seat L and also having a shank fitting loosely within the socket of the valve, the collar fitted around the valve, and springs interposed between said collar, the piston, and the abutment in the casing, as and for the purposes described.

In testimony whereof I have hereunto set my hand, in the presence of the two subscribing witnesses, on this 10th day of February, 1890.

JOHN PHILLIPSON.

Witnesses:
JONATHAN RUSHFORTH,
DAVID NOWELL.